July 9, 1968 R. J. W. C. STOW 3,391,767
HYDRAULIC PRESSURE CONTROL SYSTEM FOR CLUTCHES
Filed Jan. 6, 1966 3 Sheets-Sheet 1

INVENTOR
ROBIN J.W.C.STOW
John W. Baines
ATT'Y

July 9, 1968   R. J. W. C. STOW   3,391,767
HYDRAULIC PRESSURE CONTROL SYSTEM FOR CLUTCHES
Filed Jan. 6, 1966   3 Sheets-Sheet 3
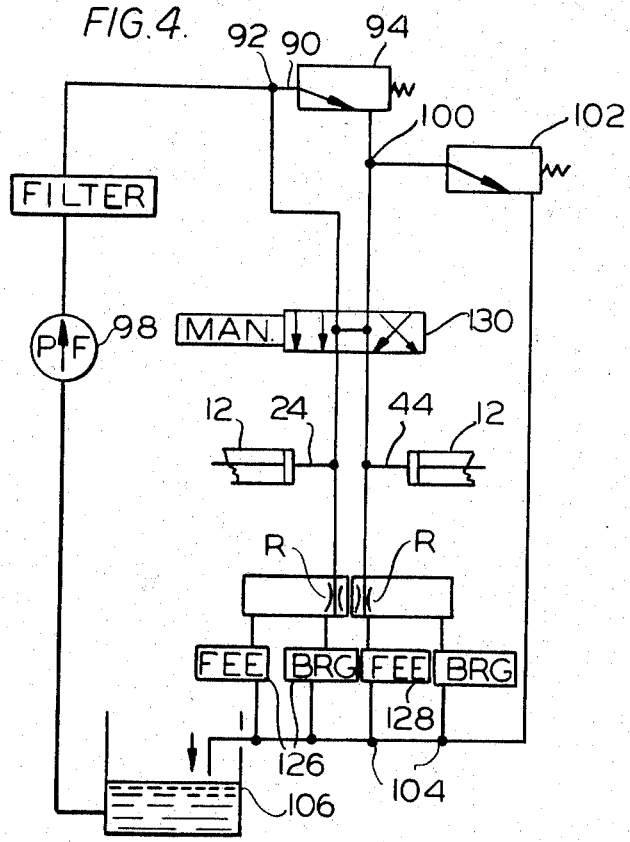
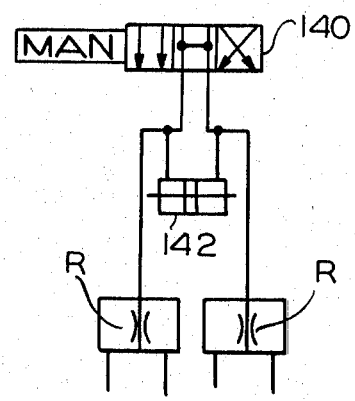
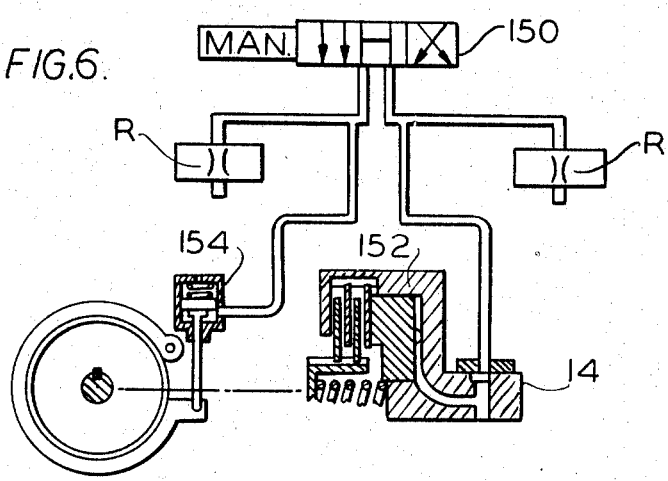
INVENTOR
ROBIN J.W.C. STOW
John W. Gaines
ATT'Y

United States Patent Office 3,391,767
Patented July 9, 1968

3,391,767
HYDRAULIC PRESSURE CONTROL SYSTEM FOR CLUTCHES
Robin J. W. C. Stow, Freelton, Ontario, Canada, assignor to International Harvester Company, Chicago, Ill., a corporation of New Jersey
Filed Jan. 6, 1966, Ser. No. 519,156
5 Claims. (Cl. 192—87.19)

ABSTRACT OF THE DISCLOSURE

Dual pressure hydraulic system for control of plural clutch packs and having a single pump and a single range-selector valve. In the neutral position of the range-selector valve, an oil supply going to lubricating and cooling purposes to the clutch packs is insured in a predetermined volume by a series of restrictions provided and the lubricating pressure is insured by valving provided. In either of two or more operating positions of the range selector valve, the oil supply to the non-selected, one or more clutch packs is insured in adequate volume and at adequate pressure by the restriction and valving means aforesaid, which also insure that oil at engaging pressure is supplied to the selected clutch pack and oil in a higher volume than the predetermined volume is supplied to the selected clutch pack for lubrication and cooling purposes.

---

This invention pertains to hydraulically controlling a power transmission having friction engaging elements for selecting the gear ratio and direction of drive. It generally relates to an hydraulic control system for selectively actuating those friction engaging elements, such as the clutches and/or brakes of the transmission, and particularly relates to unloader valving for automatically reducing the hydraulic pressure when no clutch or brake is under hydraulic actuation.

In accordance with the system of my invention, I provide a common source of pressure, such as a single gear pump, and three levels of pressure are made available in the system. A lubricating and cooling pressure is maintained at all times to cool the friction engaging elements and to keep the bearings for the actuator devices and for all shafting lubricated by force fed oil. The drain pressure is at, or no more than slightly above, atmospheric level so that the bearings and friction engaging elements readily drain as necessary. Finally a high actuating pressure is available, which arises as a load on the pump only when the actuator devices are actuated, and which exceeds the lubricating and cooling pressure by a sufficient amount that the lubricating and cooling pressure is incapable of actuating the devices.

A primary disadvantage of many hydraulic power control systems of the type having hydraulically actuated brake, or holding, devices and clutch devices for transmitting the drive, particularly where high pressures are employed, is the waste of power during the time the hydraulically actuated devices are not utilizing pressure. During that idling time, the hydraulic pressure is usually bypassed through a relief valve, the relief valve being, in accordance with conventional practice, set to open at a pressure slightly higher than the highest pressure required in the actuation of the hydraulic devices so that full operating pressure is always readily available. Then without exception under the periods of operation the pressure source, for example a gear pump, is under a load and is under maximum load during the idling period. As a result, wear is undesirably heavy and the pump must be designed for continuous operation under full load, thus requiring a considerably heavier duty pump than required for less than full time operation.

For example, in hydraulically controlled power transmissions, there is a considerable idling period during which the pressure output from the pressure pump must be bypassed. At the same time, hydraulic pressure must be instantly available to actuate the clutch devices and/or the brake devices when required. Therefore during idling the pressure source continues under maximum load, with resultant waste of power and undue wear of the hydraulic pressure pump as already indicated, plus excessive heating of the so-called hydraulic fluid (oil).

My invention has the technical advantage of materially reducing or substantially eliminating the foregoing disadvantages, as will now be explained. Various features, objects, and advantages are either specifically pointed out or will become apparent when, for a better understanding of the invention, reference is made to the following description taken in conjunction with the accompanying drawings, which show a preferred embodiment thereof and in which:

FIGURE 4 shows another embodiment;

FIGURE 5 shows a modification of FIGURE 4; and

FIGURE 6 shows further modification of FIGURE 4.

Figure 1:
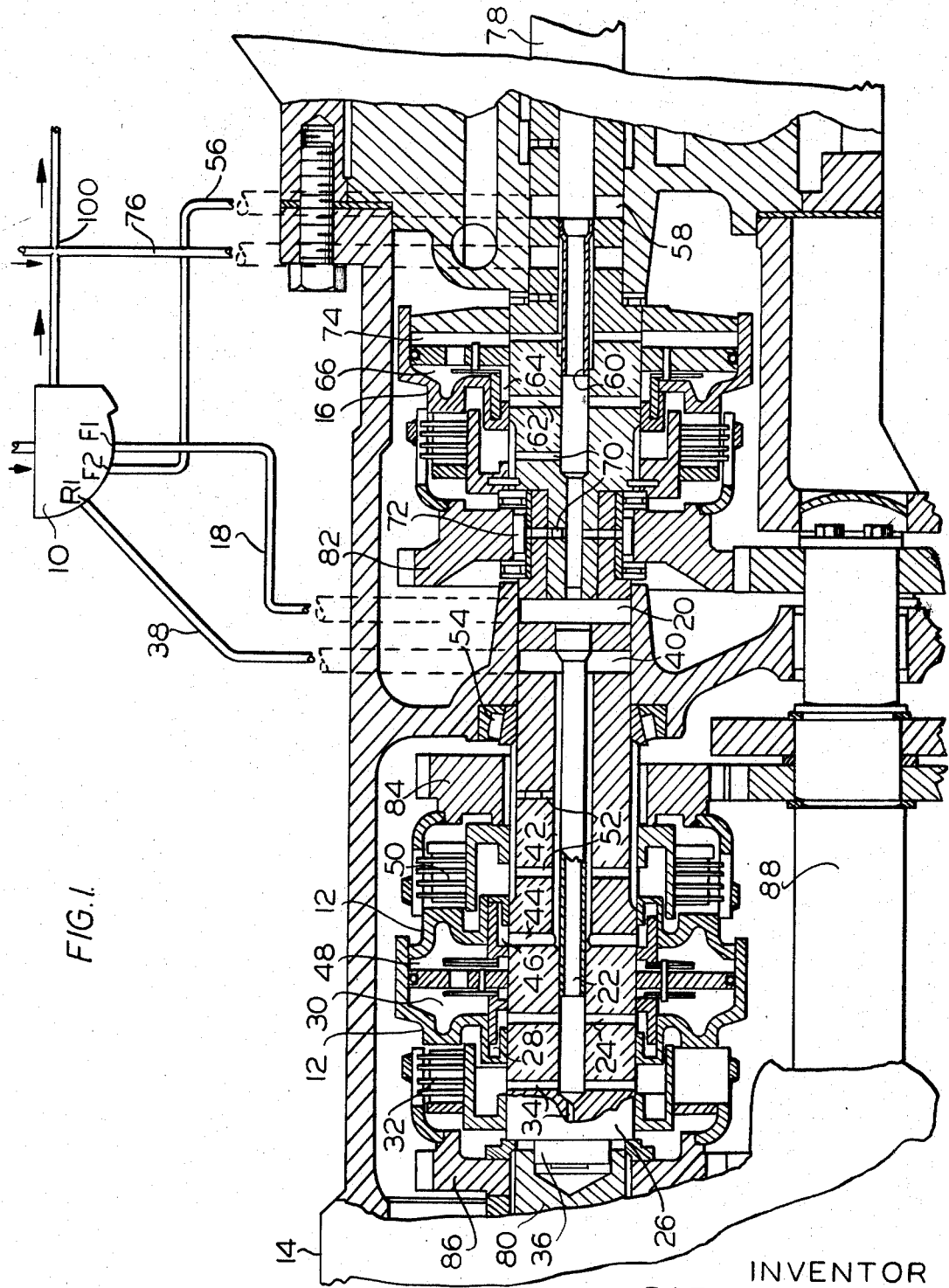
FIG. 1 is a longitudinal sectional view through an hydraulically actuated vehicle transmission embodying the present invention.
Figure 2:
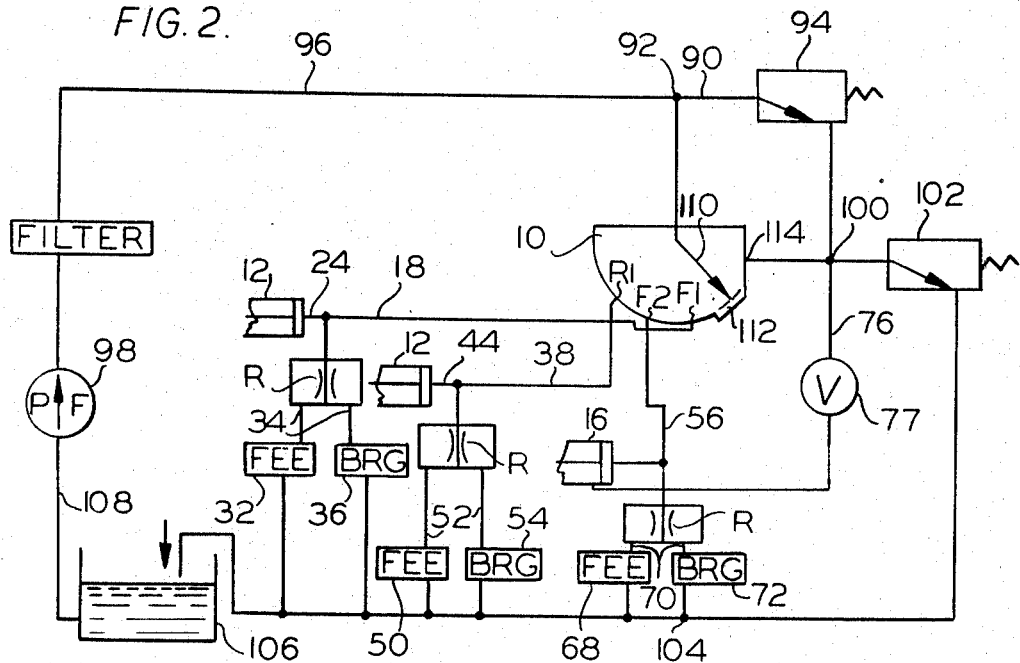
FIGURE 2 is a one-line circuit diagram of the control system according to the invention, as applied to the transmission of FIGURE 1.

Collectively in FIGURES 1 and 2 of the drawings, a transmission ratio selector valve 10 which is schematically shown as having four positions, has connecting fluid lines to a pair of direction-clutch actuator devices 12 and to a speed clutch actuator device 16 located respectively in an intermediate portion and the forward portion of a vehicle transmission 14. A first fluid line, leading from a port F1 in the valve 10, is generally indicated at 18 and introduces fluid in a path specifically including a radial passage 20 in the transmission 14, a longitudinally extending inner passage 22, a radial passage 24 in an intermediate shaft 26, a secondary cylinder 28, and a primary hydraulic cylinder 30. The plate elements of a direct drive clutch 32 frictionally engage due to the fluid pressure in the rear actuator device to complete a path through the transmission gearing establishing low speed forward drive of the vehicle.

Branch (passage) lines 34 connect the first line 18 to the friction engaging elements of the clutch 32 for cooling and to the adjacent bearing 36 for lubrication purposes. Each branch line 34 offers, as collectively indicated at R in FIGURE 2, a restriction to fluid flow so as to establish a differing level of pressure upstream and downstream thereof for reasons to be explained.

A second fluid line, leading from a port R1 in the selector valve 10, is generally indicated at 38 and introduces fluid flow in a path leading specifically through a radial passage 40 in the transmission 14, a longitudinally extending annular outer passage 42 in the intermediate shaft 26, a radial passage 44, a secondary cylinder 46, and thence into a primary hydraulic cylinder 48 in the forward one of the actuator devices 12.

A stack of clutch plate elements forms a friction engaging reverse clutch 50 which is actuated by the device to complete a reverse drive path through the transmission 14. The back-to-back arrangement of the clutches 32 and 50 can be termed a forward-reverse clutch pack assembly.

Branch (passage) lines 52 restrictively lead from the fluid line 38 to the friction engaging elements of the clutch 50 for cooling, and to one or more shaft bearings 54 for lubrication purposes. Each branch line 52 includes a restriction, collectively indicated at R in FIGURE 2, so as to establish an upstream and downstream level of pressure.

A third fluid line leading from a port F2 in the selector valve 10 is indicated generally at 56 and introduces fluid flow in a third path specifically including radial passage 58, a longitudinal inner passage 60, a radial passage 62, a secondary cylinder 64, and a primary hydraulic cylinder 66. A set of plates forms a friction engaging overdrive clutch 68 which, when actuated hydraulically by the actuator device 16, provides a high speed forward drive path through the gearing of the transmission 14.

Branch (passage) lines 70 which are radially formed in a shaft lead from the fluid line 56 and passage 60 to the friction engaging elements of the clutch 68 for cooling and to a bearing 72 for lubrication purposes. Each of the branch lines 70 includes a restriction, collectively indicated at R in FIGURE 2, and they thus restrict the flow so as to establish differing levels of pressure on the upstream and downstream sides.

An auxiliary chamber 74 behind the primary hydraulic cylinder 66 within the actuator device 16 has a service fluid line 76 connected thereto, and a valve 77 (FIGURE 2) is included in the fluid line 76 for control purposes.

More specifically with respect to FIGURE 1, the transmission 14 includes an input shaft 78 coupled to an engine, and an output shaft 80 coupled to a change-speed gearbox for the vehicle, not shown. Gears 82, 84, and 86 carried on the input shaft 78 and on the intermediate shaft 26 are in continuous mesh with mating gears carried on a transmission countershaft 88 so that by selective actuation of the directional clutches and the speed clutch, the actuator devices 12 and 16 control the referred to power drive paths through the transmission 14.

More specifically with respect to FIGURE 2, an unloader valving circuit 90 has a high operating pressure junction 92 therein on the upstream side of a first relief valve 94. The junction 92 is supplied by a pump output line 96 from a pump 98. An intermediate pressure junction 100 is on the downstream side of the first relief valve 94 and is maintained at a downstream pressure by a second relief valve 102 included in the unloader valving circuit 90. A plurality of drain pressure junctions 104 is connected in the unloader valving circuit between the second relief valve 102 and a reservoir 106. A pump suction line 108 interconnects the reservoir 106 and the pump 98.

The range selector valve 10 is a rotary valve in the illustrated case having a rotary element, or else it can have a spool element, such valve element in the illustrated case being indicated at 110 in the neutral position. All valve ports are thus freely interconnected, namely, the ports R1, F2, F1, a neutral port 112 with which the moveable valve element 110 communicates in neutral, and a permanently open port 114 leading to the intermediate pressure junction 100.

Oil supplied by the pump 98 via the outlet line 96, the operating pressure junction 92, the valve element 110, the neutral port 112, and the interior of the valve 10, initially in entirety flows through the first, second, and third fluid lines 18, 38 and 56, the restrictions R, the friction engaging elements FEE and bearings, and thence into the reservoir 106.

Ultimately, the restrictions R cause a pressure buildup to the point where the relief valve 102 opens. The maximum pressure reached in the system under the neutral range valve setting is the intermediate pressure established by the second relief valve 102. The neutral position is effectively a full bypassing position so far as it concerns the first relief valve 94, which is thus rendered ineffective by the valve 10.

The valve element 110 in the range selector valve is moved to a position registering with the port F1 in order to establish direct drive. Oil supplied by the pump, via the output line 96, the port F1, and the fluid line 18, initially fills and operates the rear actuator device 12 and simultaneously flows through the restriction R, the branch lines 34, and the friction engaging elements 32 and bearings 36 into the reservoir 106. After the actuator 12 is filled through the passage 24, there is an increased flow through the restriction R which causes buildup of back pressure through the port F1, the valve element 110, and the portion of the unloader circuit 90 between the high operating pressure junction 92 and the first relief valve 94. The first relief valve 94 will open, maintaining the desired maximum operating pressure upstream thereof. The intermediate pressure junction 100 is maintained at the proper downstream pressure by the second relief valve 102. Hence, the ports R1 and F2 are fed at intermediate pressure in the previous manner, the pressure being sufficient for lubrication and cooling but not enough to operate the respective actuators 12 and 16 connected thereto.

Positioning of the valve element 110 in registry with the reverse port R1 or with the overdrive port F2, in an analogous manner to the operation just described, operates the reverse directional clutch or the overdrive speed clutch, all at the same time insuring cooling and lubrication of respectively, all inactive friction engaging elements and all bearings.

Figure 3:
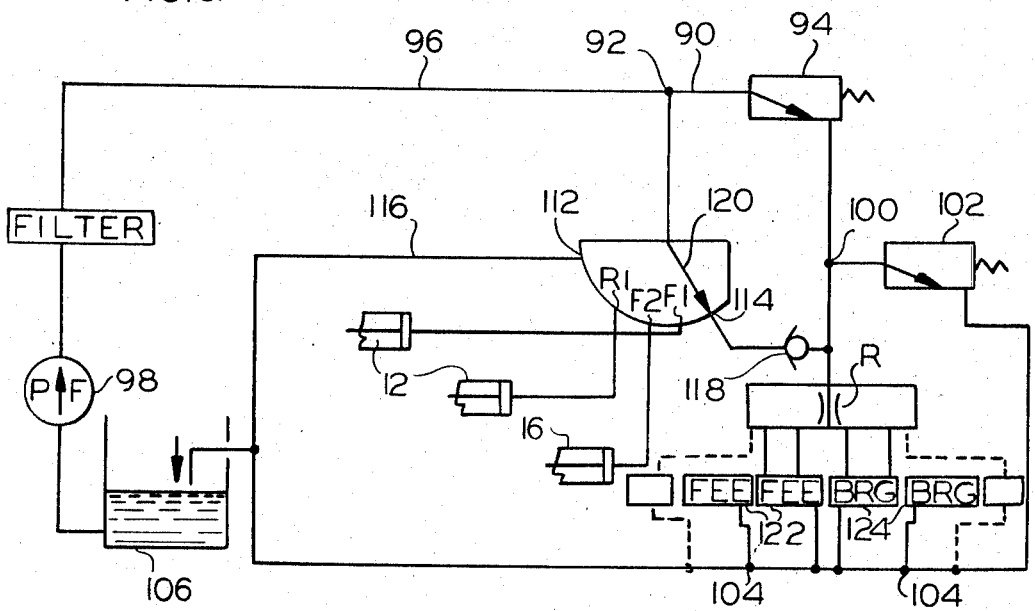
FIGURE 3 is a diagram of another embodiment of the invention.

In the differing modification of FIGURE 3, the difference is that the lubrication and cooling circuits are separate from the actuator operating circuits. The range valve element 120 cooperates with a port 114 connected to the intermediate pressure junction 100, and does not register with a permanently open port 112 which is connected by a fluid drain line 116 directly to the reservoir 106.

In the neutral position of the valve element 120, oil supplied by the pump 98, via the output line 96, the high pressure junction 92, the valve element 120, the connected port 114, a check valve 118, and the intermediate pressure junction 100, initially flows in entirety to the friction engaging elements 122 and bearings 124 all supplied by one or more of the individual, intervening restrictions R. The restrictions cause a pressure buildup, opening the second relief valve 102 which maintains the desired intermediate pressure at the junction 100 and which discharges all excess oil flow directly to the reservoir 106. The first relief valve 94 is effectively bypassed and the ports 112, R1, F2, and F1 are freely interconnected so that the actuators 12 and 16 are maintained at drain pressure by means of the drain line 116.

The valve element 120 is a four-position valve element and can be moved from neutral into any one of registering operating positions R1, F2, or F1. When in such a position, the valve element 120 directs flow to the associated actuator device 12 or 16 and into the cylinder as selected, and initial oil flow goes entirely into the cylinder to fill and move it. When the cylinder is filled, back pressure builds in the circuit of the element 120, the operating pressure junction 92, the intervening portion of the unloader valving circuit 90, and the first relief valve 94 so as to open the relief valve. The resulting flow past the intermediate pressure junction 100 is through the restriction R, which further builds up the back pressure until the second relief valve 102 opens. At that point, the operating pressure is maintained by the valve 94 at the operating pressure junction 92, the downstream pressure is maintained at the intermediate pressure junction 100 by the valve 102, and drain pressure exists elsewhere in the system. The check valve 118 is unidirectional, and seats so as to prevent downstream pressure from being lost through the now open port 114, the valve, the port 112, the drain return line 116, and thence into the reservoir 106. The two nonselected ones of the three ports R1, F2, and F1 are at drain pressure.

In the embodiment of FIGURE 4, a three position, open center range selector valve 130 is shown applied to a system similar to the system of FIGURE 2, but having only a pair of actuator devices 12. In the neutral position of the valve 130, which as illustrated is the position between the opposite operating positions, the first relief valve 94 is bypassed, and the second relief valve 102 maintains the downstream pressure at the intermediate pressure junction 100.

Positioning of the valve element 130 into either of the opposite operating positions, connects the intermediate pressure junction 100 to one of the devices 12 and connects the high operating pressure junction 92 to the other of the devices 12. As soon as the operating device fills and starts moving, the associated restriction R creates back pressure which opens the first relief valve 94 and then, in turn, the second relief valve 102 opens. Thus cooling and lubrication occur under the desired downstream pressure and operation of the actuator occurs at the necessary upstream pressure.

In the modification of FIGURE 5, the valve element 140 operates a double acting cylinder 142 in either of selective opposite directions. In all other respects the system is the same as the one shown in FIGURE 4.

In the modification of FIGURE 6, the valve element 150 operates a clutch actuator 152 and a brake actuator 154. The system is the same as in the two immediately preceding species of the invention, except that in the system of FIGURE 4 two clutch actuators are disclosed, and in the system of FIGURE 5 a double acting cylinder is disclosed.

So long as the pump 98 is sufficiently over capacity to insure some flow through the second relief valve 102, all components of the hydraulic system are continually supplied for operation, cooling, and lubrication. The pressure rating should be such that the pump provides an upstream pressure of, for example, 90 p.s.i. and a downstream pressure of, for example, 15 p.s.i. The first and second relief valves 94 and 102 are set for quite accurately maintaining the pressures in these examples, or such other upstream and downstream pressures in the system suitable for the particular components selected. The reduction of pump pressure attendant with moving the range valve into neutral is accomplished automatically during the idling of each system, due to the inherency therein of always completely bypassing the first relief valve.

From the foregoing, the interaction of each restriction R with the relief valving, particularly the second relief valve 102, can be readily appreciated. Without the operation of the relief valve 102, there would be no reasonable upper limit on the downstream pressure, and on the oil flow rate across the friction wear surfaces and bearings. The relief valve control also insures that the maximum downstream pressure is incapable of operating any actuator device subjected to that pressure. Each lubricating or cooling passage restriction R has two important functions. Such restriction R is sized and arranged as a flow orifice providing continual back pressure equal to the pressure at which the relief valve 102 is set to operate, so that the relief valve continuously operates and maintains the set downstream pressure in the system. Each such restriction R is of a calibration to insure that, at such set pressure, the throttled discharge therefrom for cooling or lubricating is neither excessive nor inadequate.

As herein disclosed it is evident that a two-cylinder system as shown can be adequately controlled by a three position range valve, and that a three-cylinder system as shown can be adequately controlled by a four position range valve. Self-evidently, a system with more than three cylinders which utilizes my invention can be coordinately controlled with a multiposition valve having a commensurate number of positions plus one or more further positions, including neutral so as to unload the pump to a low (15 p.s.i.) idling pressure.

What is claimed is:
1. An hydraulic system comprising, in combination:
   pumping means having a pump discharge;
   a first relief valve;
   a second relief valve having the opening for input thereto on the downstream side of the pumping means and being effective for continuously maintaining an intermediate maximum back pressure in the downstream side opening;
   pump supplied, plural hydraulic means, there being primary hydraulic means comprising at least two alternately pressure operable, friction drive actuator devices, there being secondary hydraulic means comprising wear surface or bearing means, or both, in said devices;
   a multiposition selector valve (10);
   separate primary fluid passages interconnecting said valve and each of the drive device actuators;
   said selector valve having a plurality of interconnecting positions each connecting the pump discharge through the selector valve and an appropriate one of said fluid passages to a selected one of the drive device actuators in the primary hydraulic means, and having a bypassing position; said selector valve in any such position connecting any nonselected actuator in the primary hydraulic means to the downstream pressure opening;
   said first relief valve being connected hydraulically in parallel with the distributor valve between the pump discharge and the downstream pressure opening so that when said distributor valve is moved from the bypass position to any of said plural interconnecting positions, the first valve is effective for maintaining a high maximum upstream pressure available from the pump discharge; and
   separate secondary fluid passages interconnecting the secondary hydraulic means and each of the primary fluid passages, and each including a restriction therein for continuously effecting a throttled discharge of cooling-and-lubricating fluid into the secondary hydraulic means so as to create back pressure insuring the maxima of pressures aforesaid.

2. The invention of claim 1, said selector valve (10) comprising a transmission range selector valve, said friction drive actuator devices comprising the speed and directional clutches (32, 50, 68) in a power transmission (14).

3. The invention of claim 1, said actuators comprising power cylinders separate and apart from one another.

4. The invention of claim 1, said actuators comprising companion cylinders forming the opposite cylinder portions of a forward-reverse clutch pack assembly.

5. The invention of claim 1, said actuators comprising opposite halves of a double acting cylinder.

References Cited

UNITED STATES PATENTS

| | | | |
|---|---|---|---|
| 3,105,582 | 10/1963 | Ziabicki | 192—113.2 |
| 3,110,196 | 11/1963 | Hilpert et al. | 192—87.19 X |
| 3,151,718 | 10/1964 | Temple | 192—87.13 X |
| 3,262,529 | 7/1966 | Kramer | 192—87.18 X |

BENJAMIN W. WYCHE III, *Primary Examiner.*